Oct. 8, 1940.  F. H. GULLIKSEN  2,217,478
SPEED REGULATOR
Filed Sept. 7, 1939
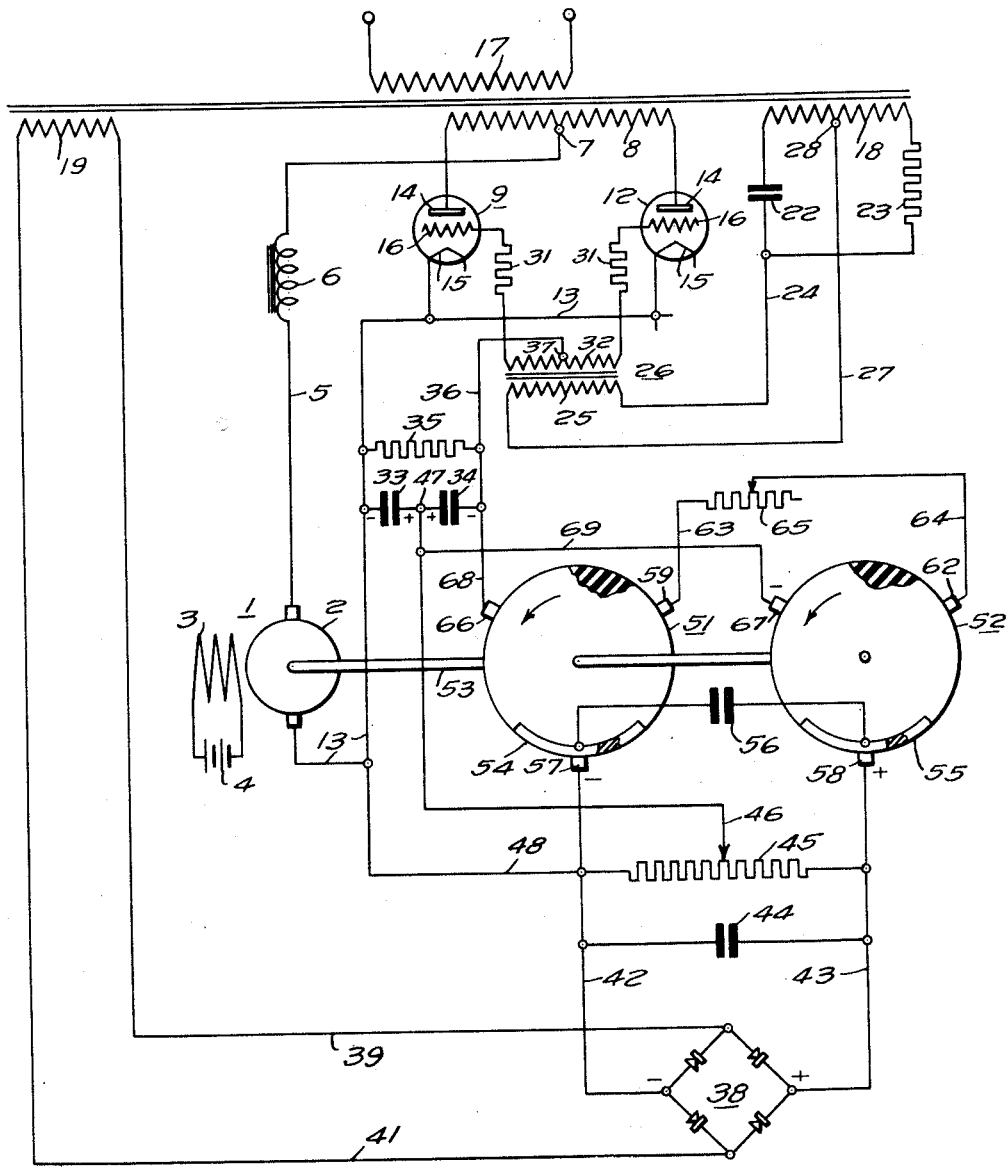
WITNESSES:
INVENTOR
Finn H. Gulliksen
BY
Franklin E. Hardy
ATTORNEY

Patented Oct. 8, 1940

2,217,478

UNITED STATES PATENT OFFICE 2,217,478

SPEED REGULATOR

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,723

12 Claims. (Cl. 172—231)

My invention relates to a speed regulating system for direct-current motors. More particularly, my invention contemplates supplying direct-current from an alternating-current source through electronic rectifiers that are controlled in accordance with the speed of the motor being supplied so as to maintain the motor speed at a desired value.

It is an object of the invention to provide a speed regulator for direct-current motors that is inexpensive to build and operate, and that is sensitive to slight changes in the motor speed from a desired value.

It is another object of the invention to provide a speed regulating system in which the supply of direct-current from an alternating-current source is controlled by governing the operation of electronic rectifier devices.

It is a further object of the invention to provide a speed regulator of the indicated character in which the control of the motor is effected by means of a capacitor-resistor discharge circuit that is so arranged that the capacitor is repeatedly charged and then discharged an amount which varies in accordance with the speed of the regulated motor and is employed to control the speed.

Other objects and advantages of the motor will be apparent from the following description of a preferred embodiment thereof, reference being had to the accompanying drawing in which the single figure is a diagrammatic view of circuits and apparatus constituting an embodiment of the invention.

Referring to the drawing, a direct-current motor 1 is provided having an armature winding 2 and a field winding 3 that is shown connected to a supply of direct-current energy, such as a battery 4. The armature winding is shown as supplied with unidirectional current from a circuit including conductor 5, reactor 6, to a mid-point 7 of the secondary transformer winding 8, hence through two branch circuits including the opposite halves of the winding 8, the rectifier tubes 9 and 12, and the return circuit conductor 13. Each of the rectifier tubes 9 and 12 is provided with an anode 14, a cathode 15 and a grid 16. The transformer winding 8 is inductively related to a primary winding 17 connected to a source of alternating current energy, the transformer being also provided with secondary windings 18 and 19 which are also inductively related to the primary winding 17 to receive energy therefrom. The winding 18 serves as a source of alternating-current supplied through a phase shifting network including a capacitor 22 and a resistor 23 connected to opposite ends of the winding 18 and to a common conductor 24, through which a circuit extends including the primary winding 25 of a grid transformer 26, and conductor 27 to the mid-point 28 of the winding 18. The grids 16 are connected through resistors 31 to the opposite ends of a secondary winding 32 of the grid transformer 26. The grid-control circuit for controlling the conductivity of the tubes 9 and 12 extends from the cathodes 15 through conductor 13, capacitors 33 and 34, connected in series relation with each other and in parallel circuit relation to a resistor 35, through conductor 36 to the mid-point 37 of the grid-control transformer winding 32, thence through opposite halves of the winding 32 and resistors 31 to the control grids 16 of the two tubes 9 and 12.

The capacitor 33 is connected to a source of unidirectional current comprising the rectifier 38 in such manner as to introduce a positive bias in the circuit between the cathodes 15 and the grids 16. The rectifier 38 receives a supply of alternating-current energy from the secondary winding 19, through conductors 39 and 41, and delivers unidirectional current to conductors 42 and 43. A capacitor 44 is connected between the conductors 42 and 43 to smooth out the alternating-current ripple, and a resistor 45 is also connected between the conductors 42 and 43 from an intermediate point of which a conductor 46 is connected to a junction point 47 between the capacitors 33 and 34. The capacitor 33 is charged through conductors 46 and 48 to a voltage corresponding to a selected portion of the voltage drop across the resistor 45.

Means is provided for introducing a controlled negative bias into the grid-control circuit across the capacitor 34, and comprises a pair of disks or rotary contact members 51 and 52 driven in synchronism by a shaft 53 in accordance with the speed of the motor 1. The rotary contact members are formed of insulating material such, for example, as Micarta, and are provided with conducting metallic segments 54 and 55 extending along corresponding angular portions of the two rotary contactors and between which a capacitor 56 is connected.

A pair of brushes 57 and 58 are provided and are so arranged as to engage the conducting segments 54 and 55, respectively, over corresponding portions of the rotative movement of the members 51 and 52. The brushes 57 and 58 are connected by conductors 42 and 43 to the output or direct-current terminals of the full wave rectifier unit 38 to supply a charging current to the capacitor 56 during that portion of the rotation of the rotary contact members during which the brushes 57 and 58 are in engagement with segments 54 and 55, respectively.

A second pair of brushes 59 and 62 are provided in engagement with the rotary contact members 51 and 52, respectively, and are so positioned as to simultaneously engage the conducting segments 54 and 55 of the rotary contact members during like portions of their rotative movement. A discharge circuit including conductors 63, 64 and a variable resistor or impedance device 65 is provided for a purpose to be later described.

A third pair of brushes 66 and 67 are provided in engagement with the rotary contact members 51 and 52, respectively, and are so positioned with respect to the axis of revolution thereof as to simultaneously engage the conducting segments 54 and 55 during corresponding portions of the rotative movement of the members 51 and 52. The brush 66 is connected by conductor 68 to the negative terminal of the capacitor 34 and the brush 67 is connected by conductor 69 to a positive terminal of capacitor 34.

If the motor is operating in a direction such that the shaft 53 and the rotary contact members 51 and 52 revolve in the direction shown by the arrows, that is, in a counterclockwise direction as viewed in the drawing, the capacitor 56 will be connected through segments 54 and 55 and brushes 57 and 58 to the source of direct-current energy supplied by the rectifier 38 through conductors 42 and 43 during a portion of each revolution of the rotary members, thus applying a predetermined charge to the capacitor 56.

As the contact members 51 and 52 continue to rotate in a counterclockwise direction, the segments 54 and 55 will be brought into engagement with brushes 59 and 62 simultaneously, thus permitting a partial discharge of the capacitor 56 through the discharge circuit including the impedance device 65. The rate of discharge through this circuit may be controlled by adjusting the impedance of the discharge circuit. The amount of discharge of the capacitor 56 through this circuit will vary as the rate of rotation of the shaft 53 and the rotary members 51 and 52 vary, because of the varying length of time during which the discharge circuit is completed, that is, the time required for the conducting segments 54 and 55 to pass through the arc during which they are in engagement with the brushes 59 and 62, respectively.

As the members 51 and 52 continue to rotate, the segments 54 and 55 are brought into engagement with brushes 66 and 67, respectively, thus applying the residual charge from the capacitor 56 across the capacitor 34 to introduce a negative bias into the grid controlled circuits of tubes 9 and 12. The amount of this negative bias is determined by the residual charge remaining on the condenser 56 after it has first received its charge through brushes 57 and 58 and been partially discharged through the circuit completed through brushes 59 and 62. It will be noted that the segments 54 and 55 extend over an arc that is less than the spacing between the three pairs of brushes so that these segments can engage one pair of brushes only at one time. It will be also appreciated that the rate of charging the capacitor 56 is such that it receives substantially the same charge during each revolution of the rotary contacts 51 and 52 regardless of the speed at which these members rotate. However, the partial discharge of the capacitor 56 through the discharge circuit is limited by the value of the resistor 65 so that the amount of discharge varies with the speed of the rotary contact members, the capacitor 56 being discharged a greater amount when the members 51 and 52 are rotated at low speed than when rotating at high speed. Consequently, the charge applied across the resistor 65 is less when the rotary contact members 51 and 52 operate at higher speeds than when they operate at lower speeds and varies with variations in speed. Consequently, the grids 16 of the tubes 9 and 12 become more negative with respect to the cathodes 15 as the motor speed increases, thus decreasing the flow of current to the tubes 9 and 12. Likewise, a potential of the grids 16 becomes more positive as the motor speed decreases thus increasing the flow of current to the motor 2.

The different component parts of the circuit, including the value of the resistors 45 and 65, are so adjusted that the voltage applied across the capacitor 33 and the charge applied to the capacitor 56 causes the equipment to control the operation of the motor 1 at a desired value. An increase in speed above this desired value causes the mechanism controlled by the rotary contactors to decrease the supply of current through the tubes 9 and 12 and decrease the motor speed. Likewise, a decrease in the motor speed causes an increase in the supply of current thus preventing an appreciable variation in the motor speed from the desired value.

Modifications in the arrangement of the apparatus and circuits illustrated and described within the spirit of my invention will occur to those skilled in the art and I do not wish to be limited otherwise than by the scope of the appended claims.

I claim as my invention:

1. In a speed regulating system, a direct-current motor, electronic rectifier means for supplying unidirectional electric energy to said motor from an alternating-current source of electric energy, a grid-control circuit for controlling said rectifier means, and means for introducing a voltage component into the grid-control circuit that is a measure of the motor speed comprising a capacitor, and means for controlling the charge on said capacitor in accordance with the motor speed.

2. In a speed regulating system, a direct-current motor, electronic rectifier means for supplying unidirectional electric energy to said motor from an alternating-current source of electric energy, a grid-control circuit for controlling said rectifier means, and means for introducing a voltage component into the grid-control circuit that is a measure of the speed of the regulated motor comprising a capacitor, means for repeatedly charging said capacitor to a predetermined value, an impedance device, means for partially discharging said capacitor through said impedance device an amount that varies with the speed of the regulated motor, and means for introducing a voltage component into the grid-control circuit that is determined by the charge remaining on the capacitor.

3. In a speed regulator, governing the speed of a direct-current motor, electronic means for controlling the supply of energy to the motor, a capacitor, means for charging said capacitor a predetermined amount, means for partially discharging said capacitor, and means responsive to the charge remaining on the capacitor for controlling the electronic means.

4. In a speed regulator, a direct-current motor, electronic means for controlling the supply of energy to the motor, means for controlling the operation of the electronic means comprising a pair of rotary contact members rotated in accordance with the speed of the motor, conducting segments on said members, a capacitor connected between said conducting members, means for charging said capacitor during a portion of each rotation of the rotary contact members, means for discharging said condenser for a portion of each rotation of the rotary contact members, and means responsive to the charge on the capacitor for controlling the electronic means.

5. In a speed regulator, a direct-current motor, electronic means for controlling the supply of energy to the motor, means for controlling the operation of the electronic means comprising a pair of rotary circuit controlling members rotated at a speed that is a measure of the speed of the motor, a capacitor, means for supplying charging current to said capacitor during a portion of the rotation of said pair of rotary circuit controlling members, a discharge circuit for said capacitor and means for connecting said discharge circuit across the capacitor during a portion of the rotation of said pair of rotary circuit controlling members, and means for applying the charge remaining on said capacitor for controlling said electronic means.

6. In a speed regulating system for direct-current motors, a motor to be regulated, electronic means for controlling the supply of energy to the motor, means for governing the electronic means including a grid-control circuit, a capacitor, means for charging said capacitor a predetermined amount, means for partially discharging said capacitor, and means for introducing a component of voltage into the grid-control circuit in response to the charge remaining on the capacitor.

7. In a speed regulating system for direct-current motors, a motor to be regulated, electronic means for controlling the supply of energy to the motor, means for governing the electronic means including a grid-control circuit, a pair of rotatable members correspondingly driven in accordance with the speed of the motor, a conducting segment on each rotatable member, a capacitor connected between the segments, means for applying a charging potential between said segments for a portion of a revolution thereof, means for connecting a discharge circuit including an impedance device between said segment for a portion of a revolution, and means for introducing a voltage component into said grid-control circuit that is a measure of the charge remaining on the capacitor.

8. In a speed regulating system for direct-current motors, a motor to be regulated, electronic means for controlling the supply of energy to the motor, means for governing the electronic means including a grid-control circuit, a pair of capacitors in said grid-control circuit, means for applying a constant potential charge across one of said condensers, and means for applying a charge across the other capacitor that varies with the motor speed, said means comprising a pair of rotary members driven in accordance with the motor speed and each having a conducting segment, a capacitor connected between said conducting segments, a source of charging current and means for connecting said source between said segments for a portion of a revolution of said rotary members, a discharge circuit including an impedance device and means for connecting said discharge circuit between said segments for a portion of a revolution of said rotary members, and means for connecting the second named capacitor in said grid-control circuit between said segments for a portion of a revolution of said rotary members.

9. In a speed regulating system for direct-current motors, a motor to be regulated, electronic means for controlling the supply of energy to the motor, means for governing the electronic means including a grid-control circuit, a pair of capacitors in said grid-control circuit, means for applying a constant potential charge across one of said capacitors, and means for applying a variable charge across the other capacitor comprising a master capacitor, mechanism operative for repeatedly connecting said master capacitor in sequence first to a constant potential source of charging energy, then to a discharging circuit for a time that varies with the motor speed, then to the last named grid-control circuit capacitor.

10. In a speed regulator, a direct-current motor, electronic means for controlling the supply of energy to the motor, a master capacitor, means for charging the master capacitor a given amount, a discharge circuit, means for partially discharging the capacitor through said discharge circuit, a second capacitor, means for charging the second capacitor from the master capacitor after its partial discharge through said discharge circuit, and means responsive to the charging effect on the second capacitor for controlling said electronic means.

11. In a speed regulator, a direct-current motor, a pair of spaced electric current-conducting members, a master capacitor having its terminals connected to said members, means for receiving a residual charge from said master capacitor, a source of direct current, a discharge circuit for said master capacitor, means for moving said current-conducting members at a rate that is a measure of the speed of the motor being regulated, first, to complete a circuit to said source of direct current for charging said main capacitor to a given charge, second, to complete said discharge circuit, and third, to complete a circuit to the means for receiving a residual charge from the master capacitor and an electronic device controlled by said last named means.

12. In a speed regulator system, a direct-current motor, a pair of rotary contact members rotated in accordance with the speed of the motor and each having a conducting segment extending over a portion only of the periphery thereof, a capacitor having its terminals connected to said conducting segments, a pair of brushes arranged to simultaneously engage said pair of segments, respectively, a source of electric energy connected to said brushes for charging said capacitor each time the brushes simultaneously contact said segments, a second pair of brushes arranged to simultaneously engage said pair of segments respectively when said segments are in the positions not in engagement with the first pair of brushes, a discharge circuit connected between said second pair of brushes, a third pair of brushes arranged to simultaneously engage said pair of segments respectively when said segments are in positions not in engagement with either the first pair of brushes or the second pair of brushes, and an electronic device controlled by the charge on the capacitor upon engagement of the conducting segments with the third pair of brushes.

FINN H. GULLIKSEN.